(No Model.)

G. H. BABCOCK.
FEED WATER HEATER.

No. 314,415. Patented Mar. 24, 1885.

WITNESSES:
Chas Elkin
Aug. W. Noonan

INVENTOR
George H. Babcock
BY Sydney A. Bennett
his ATTORNEY

UNITED STATES PATENT OFFICE.

GEORGE H. BABCOCK, OF PLAINFIELD, NEW JERSEY, ASSIGNOR TO THE BABCOCK & WILCOX COMPANY.

FEED-WATER HEATER.

SPECIFICATION forming part of Letters Patent No. 314,415, dated March 24, 1885.

Application filed May 29, 1884. (No model.)

*To all whom it may concern:*

Be it known that I, GEORGE H. BABCOCK, of Plainfield, in the county of Union and State of New Jersey, have made an invention of certain new and useful Improvements in Feed-Water Heaters and Purifiers; and I do hereby declare that the following is a full, clear, and exact description and specification of the same.

The object of my invention is to more effectually remove the impurities from feed-water before it enters a boiler or is used for any purpose which requires clean and pure water; and it relates to that class of feed-water heaters and purifiers in which the water is caused to come in contact, either as fine spray or a thin sheet, with steam at a high temperature, which will, as is well known, by raising the temperature of such water, cause it to release and deposit impurities commonly contained in the water of springs, wells, rivers, &c., said water being thereafter first permitted to settle, and then passed to the boiler or other receptacle either directly or through a filter.

An important object in constructing heaters of this class is to secure the most perfect and thorough contact between the steam which imparts and the water which receives heat, and to maintain such contact as long as practicable, so that the water may be raised nearly or quite to the temperature of the steam.

My invention comprises a construction whereby the water is caused to spread itself in a very thin film over the interior surface of an inverted cone while it comes in contact with steam and a steam-heated surface, as hereinafter set forth, a settling-chamber formed, preferably, in the lower part of a steam-chamber containing said cone, a filter, means for conveying the water after deposit of its grosser impurities through said filter to the final receptacle, means for cleaning, automatically, both said settling-chamber and said filter, and means for securing an independent and automatic delivery of feed-water to the said receptacle in case the usual passage through said settling-chamber and filter should be clogged or stopped.

Figure 1:
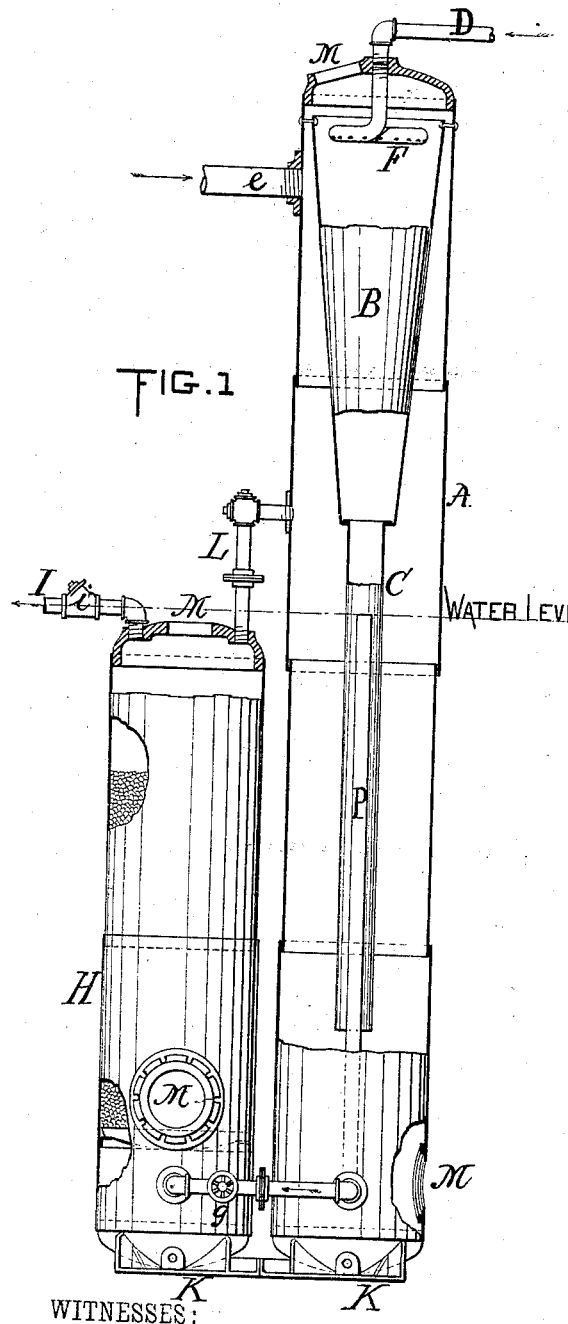
Figure 2:
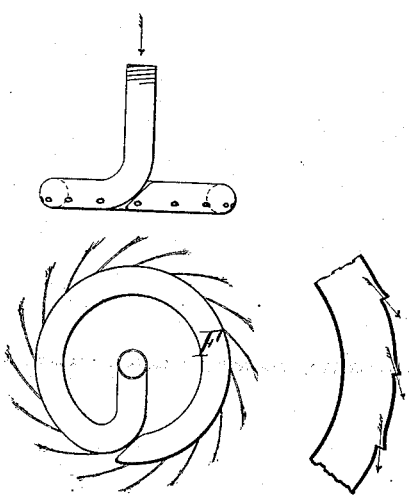
Figure 3:
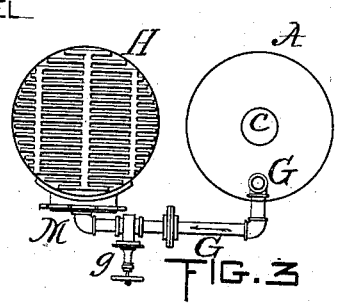
Figure 4:
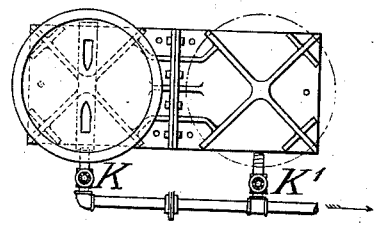

In the drawings, Figure 1 is a vertical section and partial elevation of my improved feed-water heater and purifier in the form which I now consider to be best adapted for for general use. Fig. 2 shows three enlarged views (face, plan, and section) of the inlet-pipe, showing, especially, the means preferred for delivering the water to be purified obliquely against the upper interior surface of the inverted cone B. Fig. 3 is a horizontal section of Fig. 1, (with filtering material removed,) showing the connecting-pipe *g;* and Fig. 4 is a plan of the base and saddle for holding same, showing the arrangement of the blow-off pipes.

A is a shell, preferably of boiler-iron, of sufficient strength to withstand the pressure of steam to be used within it, and made long enough to constitute both a steam and a settling chamber. Within this shell A is an inverted cone, B, somewhat smaller at its largest circumference, as shown, than the interior of said shell, to which, at its upper end, the cone is attached by rivets or other convenient means to hold it practically concentric with the said shell.

From the lower end of the cone B a pipe, C, extends downward to a point near the lower end of the shell A and concentric therewith. The feed-water (inlet) pipe D, receiving water from pumps or by any other method which will give adequate pressure, delivers water through the upper head of the shell A into an annular pipe, E, having openings arranged to cause the water to issue tangentially to a circle, (which may be smaller in diameter than the ring.) A pipe, *e*, supplies steam to the steam-chamber formed by the upper part of said shell A, preferably taking such steam direct from the steam-space of a boiler at a pressure above that of the atmosphere. This steam, filling the steam-chamber, entirely envelops the inverted cone B externally and internally at the same pressure. The water, delivered, as described, through the pipe E, strikes obliquely upon the upper interior of the inverted cone B, flows spirally in a thin film down said interior, and thence down the pipe C to the lower end of the shell A. The contact of the steam with the film so formed in the interior of the cone, and also with the outer surface of the cone itself, will heat the water detained in direct contact with the steam on one side and the steam-heated surface of the cone on the other by its spiral descent nearly, if not quite, to the temperature of such steam; and it will deposit such impurities as can thus be separated in the lower portion of the shell A, which I have termed the "settling-chamber." The water being thus delivered in the shell A will rise therein until it finds a means of escape. This is provided, under ordinary circumstances, by the pipe P, extending up, as shown, within the shell A to a point determined upon as the proper water-level, and leading thence to a filter-chamber, H, and entering at the lower portion thereof. This filter-chamber H is partially filled with coke, charcoal, sand, or other suitable filtering material supported on a grate, $h$, in such a manner that the water in rising to the upper end of the filter-chamber is compelled to pass through said material. From the upper end of said chamber H, such end being clear and above the filtering material, as shown, an outlet-pipe, I, leads to the boiler or other receptacle wherein the purified water is to be used or stored. A check-valve, $i$, in this pipe prevents the water flowing back from the final receptacle, and a valve, $g$, in the pipe G, between the filter and the main heater A, is provided to shut off the connection between them.

K and K' are blow-off pipes fitted with suitable valves, and connected, respectively, to the bottoms of the filter and the settling-chamber.

A pipe, L, connects the steam-chamber at a point somewhat above the normal water-level, with the top (or clear upper part) of the filter. This pipe has a double office. Its duty is not only to clean the filter, when required, which can be done by simply closing the valve $g$ and opening the blow-off K, when the direct pressure of the steam on the top of water in the filter will do that work, while the self-acting valve in outlet-pipe prevents any backflow, but also to act as a safety-pipe in case the passage through the filter becomes interrupted by the collection of sediment or from any other cause—such, for instance, as the accidental closing of valve $g$. In any such case of stoppage or obstruction of the regular channels, it is clear that the water will continue to rise within the shell A and above the top of the pipe P until it reaches a point whence it will flow through the pipe L, through the clear top of the filter (or practically direct and without obstacle) to the outlet-pipe I and to the final receptacle.

Proper man-holes M M M are provided for access to the interior of the different parts of the heater, both for cleaning and for removing and renewing the filtering material when the same becomes ineffective.

One advantage due to my invention is that by the arrangement of the inverted cone, the oblique delivery of the water against its upper interior surface, and the consequent spiral descent of such water in a thin film in intimate contact with the steam and with a steam-heated surface, I secure not only a more perfect heating of the water, but also by compelling it to travel a longer distance in its heated condition without enlarging the device, and of course gain time for the more complete separation of such impurities as can be precipitated by heat. Again, the filter may be blown off and cleaned without discharging the water from the main heater and settling-chamber, and thereby losing the heated water it may contain, and wasting the fuel which has been expended in heating it; and, finally, a great advantage of my heater is that absolute security is thereby provided against not only accidental or natural clogging of the filter and regular passages for the water, but also against carelessness or neglect on the part of the attendant, for in any case of such stoppages the water must find its way through the pipe L, clear and unobstructed, to the boiler or other final receptacle.

I claim as my invention—

1. In a feed-water heater and purifier, the combination of a steam-chamber, an inverted cone therein, and a feed-pipe delivering water obliquely against the upper inside surface of said cone.

2. In a feed-water heater and purifier, the combination of a steam-chamber, an inverted cone, and a pipe adapted to deliver water obliquely against the upper inside surface of said cone, with a settling-chamber wherein the impurities of the water may be deposited, substantially as described.

3. In a feed-water heater and purifier, the combination, with a steam-chamber, an inverted cone therein, and a pipe adapted to deliver water obliquely against the upper inside surface of said cone, and a settling-chamber wherein the grosser impurities of the heated water may be precipitated, of a filter for completing the purification, substantially as described.

4. In a feed-water heater and purifier having a chamber in which the water is brought into direct contact with steam, a settling-chamber wherein the grosser impurities may be precipitated, and a filter for completing the purification, a pipe connecting the steam-chamber directly with the delivery-pipe leading to the boiler or other receptacle, substantially as described.

5. In a feed-water heater and purifier having a steam-chamber and a depositing-chamber, a filter connected with the steam-chamber, and also connected with the depositing-chamber by a pipe provided with a stop-valve, said filter being also provided with a blow-off valve, substantially as and for the purposes set forth.

6. In a feed-water heater and purifier having a steam-chamber directly connected with a settling-chamber, and a filter directly connected with said steam-chamber, and connected with said settling-chamber by a connection which can be closed at will, the combination of blow-off valves in both said settling-chamber and said filter with a check-valve in the delivery-pipe leading from said filter, substantially as described.

7. In a feed-water heater and purifier, an independent safety-pipe leading without impediment from the steam-chamber to the final delivery-pipe, and adapted to act, in case the usual course of the water through the purifier is clogged or cut off, substantially as described.

8. In a feed-water heater and purifier, a pipe adapted to perform the double office of a safety or overflow water pipe and to supply steam for blowing out and cleaning the filter, substantially as described.

GEO. H. BABCOCK.

Witnesses:
CHAS. ELKIN,
JNO. SCOTT.